(12) United States Patent
Imada

(10) Patent No.: US 9,964,325 B2
(45) Date of Patent: May 8, 2018

(54) AIR CONDITIONING SYSTEM

(71) Applicant: DAIKIN INDUSTRIES, LTD., Osaka-shi, Osaka (JP)

(72) Inventor: Hiroyuki Imada, Sakai (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 373 days.

(21) Appl. No.: 14/747,700

(22) Filed: Jun. 23, 2015

(65) Prior Publication Data
US 2015/0377508 A1    Dec. 31, 2015

(30) Foreign Application Priority Data

Jun. 25, 2014  (JP) ................................. 2014-130352

(51) Int. Cl.
| | |
|---|---|
| F24F 11/00 | (2006.01) |
| F24F 3/044 | (2006.01) |
| F24F 3/06 | (2006.01) |
| F25B 49/00 | (2006.01) |

(52) U.S. Cl.
CPC ............ *F24F 11/008* (2013.01); *F24F 3/044* (2013.01); *F24F 3/065* (2013.01); *F24F 11/001* (2013.01); *F24F 11/006* (2013.01); *F25B 49/00* (2013.01); *F24F 2011/0082* (2013.01); *F24F 2011/0083* (2013.01); *F25B 2313/004* (2013.01); *F25B 2313/02331* (2013.01); *F25B 2313/02741* (2013.01); *F25B 2339/047* (2013.01); *Y02B 30/767* (2013.01)

(58) Field of Classification Search
CPC .............. F25B 49/027; F25B 2313/004; F25B 2339/047; F24F 11/008; F24F 11/0082; F24F 11/0083
USPC .................................... 62/183, 184, 305, 506
See application file for complete search history.

(56) References Cited

U.S. PATENT DOCUMENTS

| | | | | |
|---|---|---|---|---|
| 4,227,862 A | * | 10/1980 | Andrew .................. | F04C 28/06 417/12 |
| 4,974,420 A | * | 12/1990 | Kramer .................. | F25B 49/027 62/115 |
| 5,040,377 A | * | 8/1991 | Braun .................... | F25B 49/027 165/299 |

(Continued)

FOREIGN PATENT DOCUMENTS

JP       2001-304660 A    10/2001

*Primary Examiner* — Jonathan Bradford
(74) *Attorney, Agent, or Firm* — Birch, Stewart, Kolasch & Birch, LLP

(57) ABSTRACT

An air conditioning system includes an outdoor unit, indoor units, a controller that controls the outdoor unit, and an equipment controller. The equipment controller stores a set lower limit value that is set to maintain a pressure difference between the high pressure and the low pressure in the outdoor unit at a predetermined value or greater. The lower limit value is set to be smaller as a minimum cooling capacity increases. The minimum cooling capacity is the minimum value of a cooling capacity of an indoor unit arrangement formed by the indoor units. When starting a cooling operation, the equipment controller determines whether or not to perform pressure difference control for limiting decreases in the pressure difference of the outdoor unit based on whether or not the temperature of water flowing into the outdoor unit is less than the set lower limit value.

6 Claims, 4 Drawing Sheets

(56) References Cited

U.S. PATENT DOCUMENTS

| | | | | |
|---|---|---|---|---|
| 5,323,617 A | * | 6/1994 | Ichikawa | F25B 13/00 |
| | | | | 62/129 |
| 7,567,888 B2 | * | 7/2009 | Chang | F24F 11/0009 |
| | | | | 702/182 |
| 2012/0131935 A1 | * | 5/2012 | Kim | F24F 3/0442 |
| | | | | 62/115 |

* cited by examiner

AIR CONDITIONING SYSTEM

CROSS-REFERENCE TO RELATED APPLICATION

This application is based on and claims priority from Japanese Patent Application No. 2014-130352, filed on Jun. 25, 2014, the entire contents of which are incorporated herein by reference.

BACKGROUND OF THE INVENTION

The present invention relates to an air conditioning system including an outdoor unit that uses water as a heat source.

An air conditioning system using a water heat source includes an outdoor unit, which exchanges heat between water and refrigerant, and an indoor unit, which is connected to the outdoor unit. The air conditioning system further includes a refrigerant circuit formed by an indoor heat exchanger arranged in the indoor unit, an expansion valve, an outdoor heat exchanger arranged in the outdoor unit, and a compressor. During a cooling operation of the air conditioning system, the outdoor heat exchanger functions as a condenser and the indoor heat exchanger functions as an evaporator. The outdoor heat exchanger is for use with water. That is, the outdoor heat exchanger is cooled by water during a cooling operation of the air conditioning system.

When the air conditioning system performs a cooling operation, the temperature of the water flowing into the outdoor unit may become excessively low. In such a case, the outdoor heat exchanger may be overcooled. This would decrease the pressure difference between the high pressure and the low pressure in the outdoor unit, decrease the amount of refrigerant circulated through the refrigerant circuit, and lower the cooling capacity of the air conditioning system. Thus, an air conditioning system using a water heat source may employ a technique for limiting decreases in the water temperature during a cooling operation.

For example, the technique disclosed in Japanese Laid-Open Patent Publication No. 2001-304660 employs a water temperature adjusting means for adjusting the water temperature when a decrease in the water temperature causes the degree of superheating to be higher than a set value.

SUMMARY OF THE INVENTION

The conventional air conditioning system sets a lower limit value for an inflow water temperature, which is the temperature of the water flowing into the outdoor unit. When the inflow water temperature becomes lower than the lower limit value, the water is heated in water supplying equipment. This limits excessive decreases in the condensation temperature when starting a cooling operation and ensures that a pressure difference is obtained between the high pressure and the low pressure in the outdoor unit.

The arrangement of indoor units in the air conditioning system is configured in accordance with the user's needs. For example, an indoor unit arrangement may be formed by indoor units having low cooling capacities, indoor units having high cooling capacities, or indoor units having different cooling capacities.

However, regardless of the how the indoor unit arrangement is configured in the air conditioning system, the lower limit value of the inflow water temperature is set to a predetermined value in the method in which the conventional air conditioning system manages the inflow water temperature. Thus, even when the cooling operation conditions are satisfied, water may have to be heated depending on the configuration of the air conditioning system.

Accordingly, it is an object of the present invention to provide an air conditioning system using a water heat source that is capable of limiting unnecessary water heating, which may occur depending on the configuration of the air conditioning system.

To achieve the above object, the first aspect of the present invention provides an air conditioning system including an outdoor unit that exchanges heat between water and refrigerant and in which low pressure and high pressure are generated, a plurality of indoor units that is connected to the outdoor unit, a water temperature detector that detects an inflow water temperature, which is a temperature of water flowing into the outdoor unit, a controller that controls the low pressure in the outdoor unit at a fixed pressure during a cooling operation, and an equipment controller that is arranged in water supplying equipment. The equipment controller stores a set lower limit value that specifies a lower limit of the inflow water temperature. The lower limit value is set to maintain a pressure difference between the high pressure and the low pressure in the outdoor unit at a predetermined value or greater. The predetermined value of the pressure difference enables a cooling operation to be performed. The lower limit value is set to be smaller as a minimum cooling capacity increases. The minimum cooling capacity is the minimum value of a cooling capacity of an indoor unit arrangement formed by the indoor units. The equipment controller determines whether or not the inflow water temperature is greater than or equal to the set lower limit value when starting a cooling operation. The equipment controller performs pressure difference control for limiting decreases in the pressure difference of the outdoor unit when the inflow water temperature is less than the set lower limit value. The equipment controller does not perform the pressure difference control when the inflow water temperature is greater than or equal to the set lower limit value.

In the above air conditioning system, the equipment controller may obtain the inflow water temperature during a cooling operation and derives a lower limit cooling capacity from the obtained inflow water temperature. The lower limit cooling capacity is a lower limit value of the cooling capacity that allows the pressure difference of the outdoor unit to be greater than or equal to the predetermined value. The equipment controller may perform the pressure difference control when a total cooling capacity is less than the lower limit cooling capacity. The total cooling capacity is the total of cooling capacities of the indoor units that are operated.

In the above air conditioning system, the equipment controller may decrease the amount of water flowing into the outdoor unit through performing the pressure difference control.

In the above air conditioning system, when the indoor units are arranged at a higher elevation than the outdoor unit, the lower limit value may be set based on the minimum cooling capacity, lengths of connection pipes that connect the indoor units and the outdoor unit, and an elevation difference between the indoor units and the outdoor unit.

The second aspect of the present invention provides an air conditioning system including an outdoor unit that exchanges heat between water and refrigerant and in which low pressure and high pressure are generated, a plurality of indoor units that is connected to the outdoor unit, a water temperature detector that detects an inflow water temperature, which is a temperature of water flowing into the outdoor unit, a controller that controls the low pressure in the outdoor unit at a fixed pressure during a cooling operation, and an equipment controller that is arranged in a water heat source device. The equipment controller stores a set lower limit value that specifies a lower limit of the inflow water temperature. The lower limit value is set to maintain a pressure difference between the high pressure and the low pressure in the outdoor unit at a predetermined value or greater. The predetermined value of the pressure difference enables a cooling operation to be performed. The lower limit value is set during a cooling operation in accordance with a minimum cooling capacity. The minimum cooling capacity is the minimum value of a cooling capacity of an indoor unit arrangement formed by the indoor units. The controller continues the cooling operation when the inflow water temperature is greater than or equal to the set lower limit value. The controller stops the cooling operation when the inflow water temperature is less than the set lower limit value.

The third aspect of the present invention provides an air conditioning system including an outdoor unit that exchanges heat between water and refrigerant and in which low pressure and high pressure are generated, a plurality of indoor units that is connected to the outdoor unit, a water temperature detector that detects an inflow water temperature, which is a temperature of water flowing into the outdoor unit, a controller that controls the low pressure in the outdoor unit at a fixed pressure during a cooling operation, and an equipment controller that is arranged in a water heat source device. The equipment controller stores a set lower limit value that specifies a lower limit of the inflow water temperature. The lower limit value is set to maintain a pressure difference between the high pressure and the low pressure in the outdoor unit at a predetermined value or greater. The predetermined value of the pressure difference enables a cooling operation to be performed. The lower limit value is set to be smaller as a minimum cooling capacity increases. The minimum cooling capacity is the minimum value of a cooling capacity of an indoor unit arrangement formed by the indoor units.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
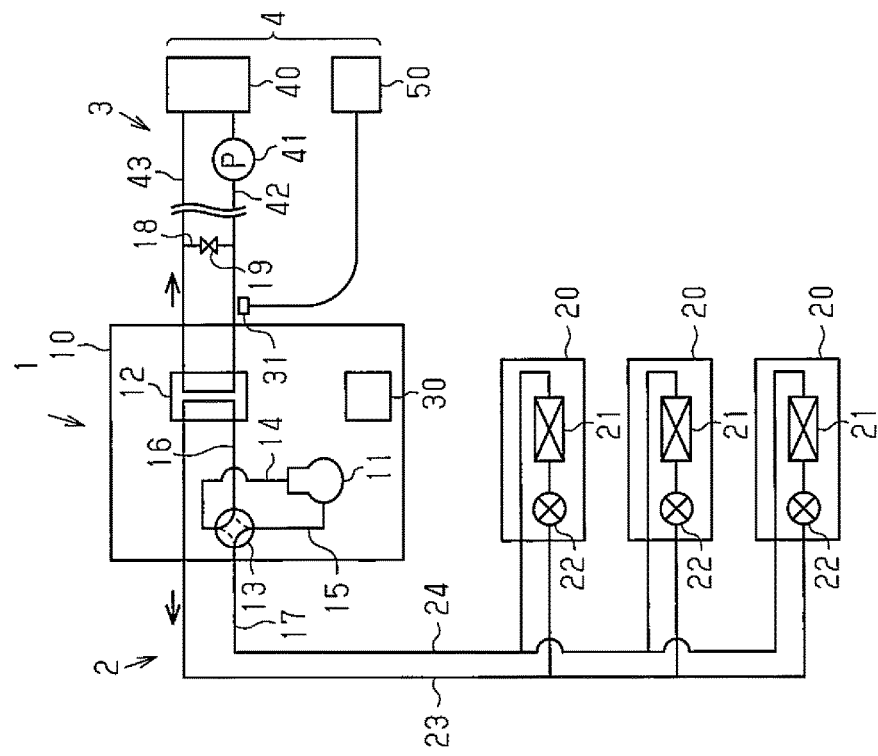
FIG. 1 is a schematic diagram showing an air conditioning system according to one embodiment of the present invention.

The configuration of an air conditioning system 1 will now be described with reference to FIG. 1.

The air conditioning system 1 includes an outdoor unit 10, which exchanges heat between water and refrigerant, a plurality of indoor units 20, each of which are connected to the outdoor unit 10, a controller 30, which is arranged in the outdoor unit 10, and an equipment controller 50, which is arranged in water supplying equipment 4. The air conditioning system 1 forms part of a facility including a water heat source device 40. The water supplying equipment 4 includes the water heat source device 40 and the equipment controller 50. The facility also includes a refrigerant circuit 2 and a water circulation circuit 3. The outdoor unit 10 and the indoor units 20 are connected with each other by two connection pipes, namely, a liquid connection pipe 23 and a gas connection pipe 24.

The water circulation circuit 3 includes a pump 41, which circulates water, and the water heat source device 40, which cools or heats water. A first pipe 42, through which the water supplied to the outdoor unit 10 flows, and a second pipe 43, through which the water discharged from the outdoor unit 10 flows, are connected to the water heat source device 40.

The water heat source device 40 is formed by, for example, a cooling tower and a boiler. During a cooling operation, the water heat source device 40 cools water at the cooling tower. During a heating operation, the water heat source device 40 heats water at the boiler. Geothermal power may be used as a heat source for the water heat source device 40. In this case, portions of the pipes 42 and 43 of the water circulation circuit 3 are buried in the ground.

The water circulation circuit 3 includes a bypass pipe 18 arranged in parallel to the outdoor unit 10. In other words, the bypass pipe 18 is arranged between the first pipe 42 and the second pipe 43. The bypass pipe 18 includes a bypass valve 19 that opens and closes the water flow passage of the bypass pipe 18. When the bypass valve 19 opens, the flow of water through the bypass pipe 18 is allowed. When the bypass valve 19 closes, the flow of water through the bypass pipe 18 is restricted.

The water that circulates through the water circulation circuit 3 is an antifreeze in which an organic matter such as ethylene glycol is dissolved. This circulates water through the outdoor heat exchanger 12 of the outdoor unit 10 even under freezing temperatures.

Each indoor unit 20 includes an indoor heat exchanger 21, which exchanges heat between the refrigerant and the indoor air, and an expansion valve 22, which expands the refrigerant. Each indoor unit 20 is connected to the liquid connection pipe 23 and the gas connection pipe 24.

The indoor unit arrangement of the air conditioning system 1 is determined based on the indoor structure of a building that incorporates the air conditioning system 1. The indoor unit arrangement is formed by, for example, indoor units 20 having high cooling capacities, indoor units 20 having different cooling capacities, or indoor units 20 having low cooling capacities.

The expansion valve 22 is arranged in the liquid connection pipe 23 between the indoor heat exchanger 21 and the outdoor heat exchanger 12. The expansion valve 22 is formed by, for example, an electric valve. The electric valve includes a motor that drives a valve body, which is movable relative to a valve seat.

The outdoor unit 10 includes a compressor 11, which compresses refrigerant gas, the outdoor heat exchanger 12, which exchanges heat between water and the refrigerant, and a four-way switch valve 13.

The outdoor heat exchanger 12 is for use with water. That is, the outdoor heat exchanger 12 exchanges heat between water, which circulates through the water circulation circuit 3, and the refrigerant, which circulates through the refrigerant circuit 2.

The refrigerant circuit 2 includes the expansion valve 22, the indoor heat exchanger 21, the compressor 11, and the outdoor heat exchanger 12. During a cooling operation, the refrigerant sequentially flows through the compressor 11, the outdoor heat exchanger 12, the expansion valve 22, and the indoor heat exchanger 21. During a heating operation, refrigerant sequentially flows through the compressor 11, the indoor heat exchanger 21, the expansion valve 22, and the outdoor heat exchanger 12.

The four-way switch valve 13 is arranged in the gas connection pipe 24 between the indoor heat exchanger 21 and the outdoor heat exchanger 12. The gas connection pipe 24 includes an indoor gas connection pipe 17 and a heat source gas connection pipe 16, which will be described below.

The four-way switch valve 13 changes the direction in which the refrigerant flows in accordance with the operating state of the air conditioning system 1. The four-way switch valve 13 connects a discharge pipe 14, which is connected to a discharge port of the compressor 11, a suction pipe 15, which is connected to a suction port of the compressor 11, the heat source gas connection pipe 16, which is connected to the outdoor heat exchanger 12, and the indoor gas connection pipe 17, which is connected to each indoor heat exchanger 21, in the following manner.

During a cooling operation, the four-way valve 13 connects the discharge pipe 14 and the heat source gas connection pipe 16 and connects the suction pipe 15 and the indoor gas connection pipe 17. As a result, the outdoor heat exchanger 12 functions as a condenser and the indoor heat exchanger 21 functions as an evaporator. In FIG. 1, the solid lines of the four-way switch valve 13 show the connection of pipes during a cooling operation.

During a heating operation, the four-way valve 13 connects the discharge pipe 14 and the indoor gas connection pipe 17 and connects the suction pipe 15 and the heat source gas connection pipe 16. As a result, the outdoor heat exchanger 12 functions as an evaporator and the indoor heat exchanger 21 functions as a condenser. In FIG. 1, the broken lines of the four-way switch valve 13 show the connection of pipes during a heating operation.

The controller 30 of the outdoor unit 10 varies the displacement of the compressor 11 in accordance with the operating statuses of the indoor units 20. For example, the controller 30 varies the displacement of the compressor 11 based on the total value of the cooling capacities of the operating indoor units 20. The displacement of the compressor 11 is regulated by controlling the motor speed of the compressor 11. During a cooling operation, the controller 30 controls the rotation speed of the compressor 11 to maintain the low pressure in the outdoor unit 10 at a predetermined value.

The equipment controller 50 receives a signal from a water temperature detector 31 that detects the inflow water temperature, which is the temperature of the water flowing into the outdoor unit 10. The signal corresponds to the inflow water temperature. The water temperature detector 31 is arranged in, for example, the water circulation circuit 3 or the water heat source device 40.

When starting a cooling operation, the equipment controller 50 determines, based on the inflow water temperature detected by the water temperature detector 31, whether or not the cooling operation can be performed in a state where the bypass valve 19 is closed. The reason for such a determination that is based on the inflow water temperature will now be described.

During a cooling operation, the outdoor heat exchanger 12 functions as a condenser. That is, during a cooling operation, the outdoor heat exchanger 12 uses water to cool the refrigerant. Thus, it is preferred that the inflow water temperature be low. However, when the inflow water temperature is excessively low, the refrigerant is overcooled. This reduces the high pressure generated in the outdoor unit 10 (that is, the high pressure in the refrigerant circuit 2). The controller 30 of the outdoor unit 10 operates the compressor 11 to control the low pressure generated in the outdoor unit 10 (i.e., the low pressure in the refrigerant circuit 2) at a fixed pressure. This reduces the pressure difference between the high pressure and the low pressure in the outdoor unit 10. A small pressure difference reduces the amount of circulated refrigerant and decreases the cooling capacity. To limit such a decrease in the cooling capacity, the equipment controller 50 determines, based on the inflow water temperature, whether or not to enable a cooling operation.

The equipment controller 50 stores a set lower limit value TW to determine whether or not a cooling operation can be performed. The set lower limit value TW represents the lower limit value of the inflow water temperature that enables a cooling operation to be performed when the bypass valve 19 is closed. The set lower limit value TW represents the lower limit value of the inflow water temperature ensuring that the pressure difference between the high pressure and the low pressure in the outdoor unit 10 is at least a predetermined value that enables a cooling operation to be performed. The "predetermined value that enables a cooling operation to be performed" is set in advance through experiments or calculations for each model of the air conditioning system 1.

The equipment controller 50 and the controller 30 are connected by a signal wire (or a communication line). The equipment controller 50 transmits information to the controller 30 such as the determination result of whether a cooling operation can be performed. The equipment controller 50 receives information from the controller 30 such as a minimum cooling capacity Pmin. The information of the minimum cooling capacity Pmin may be input manually.

Figure 2:
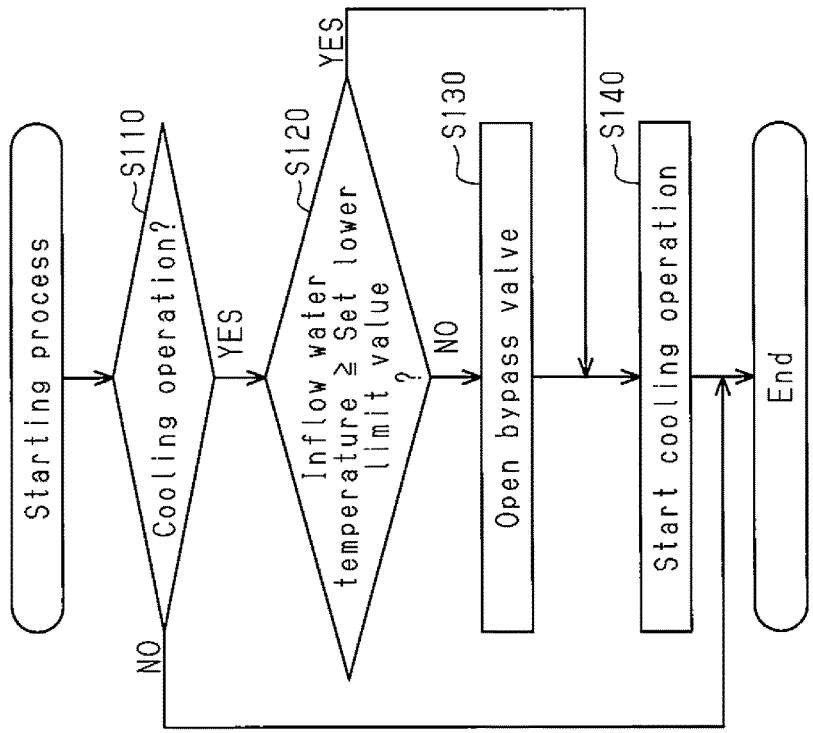
FIG. 2 is a flowchart showing the procedures for starting a cooling operation in the air conditioning system.

The procedures of a cooling operation starting process executed by the equipment controller 50 will now be described with reference to FIG. 2.

In step S110, the equipment controller 50 determines whether or not the operation mode of the indoor unit 20 is set to a cooling mode. The equipment controller 50 determines whether or not each indoor unit 20 is in the cooling mode based on information from the indoor unit 20. When the operation mode is one other than the cooling mode, that is, when the operation mode is a heating mode or a blowing mode, the starting process is terminated. When the operation mode is the heating mode or the blowing mode, a starting process corresponding to each mode is performed. When the equipment controller 50 makes an affirmative determination ("YES") in step S110, the equipment controller 50 proceeds to step S120.

In step S120, the equipment controller 50 obtains the inflow water temperature and compares the inflow water temperature with the set lower limit value TW. In step S120, when the equipment controller 50 makes an affirmative determination ("YES"), that is, when the equipment controller 50 determines that the inflow water temperature is greater than or equal to the set lower limit value TW, the equipment controller 50 proceeds to step S140. In step S140, the equipment controller 50 transmits an instruction signal to the outdoor unit 10 so that the controller 30 executes cooling operation control. This starts a cooling operation. When the equipment controller 50 makes a negative determination ("NO") in step S120, the equipment controller 50 proceeds to step S130.

In step S130, the equipment controller 50 opens the bypass valve 19 to perform control that limits decreases in the pressure difference between the high pressure and the low pressure in the outdoor unit 10 (hereinafter referred to as "pressure difference control").

This reduces the amount of water flowing into the outdoor heat exchanger 12. That is, the amount of water flowing into the outdoor heat exchanger 12 is controlled to limit decreases in the pressure difference of the outdoor unit 10 when cooling starts so that after a predetermined time elapses from when a cooling operation is started, the pressure difference of the outdoor unit 10 becomes greater than or equal to the predetermined value that enables a cooling operation to be performed.

The inflow water temperature does not increase immediately by opening the bypass valve 19. However, the water flowing into the outdoor heat exchanger 12 is restricted. Thus, the exchange of heat between water and the refrigerant increases the water temperature. This enables the air conditioning system 1 to perform a cooling operation after a predetermined time elapses from when the air conditioning system 1 is started.

Depending on the environment in which the air conditioning system 1 is installed, the water temperature may be so low that even when opening the bypass valve 19, the pressure difference of the outdoor unit 10 cannot be expected to reach or exceed the predetermined value that enables a cooling operation to be performed after a predetermined time elapses from when a cooling operation is started. Under such a situation, in addition to the series of starting processes shown in FIG. 2, the equipment controller 50 executes, between step S120 and step S130, the process in which a reference value is set to the upper limit of the water temperature, at which the pressure difference of the outdoor unit 10 cannot be expected to reach or exceed the predetermined value that enables a cooling operation to be performed after a predetermined time elapses from when the cooling operation is started. The reference value is lower than the set lower limit value TW. When the inflow water temperature is higher than the reference value, the equipment controller 50 proceeds to step S130. When the inflow water temperature is less than or equal to the reference value, the equipment controller 50 outputs a signal to the controller 30 instructing termination of the process for starting the cooling operation. That is, when the pressure difference of the outdoor unit 10 is expected not to reach or exceed the predetermined value that enables a cooling operation to be performed even after the predetermined time elapses, the equipment controller 50 provides the controller 30 of the outdoor unit 10 with a signal that disables execution of the cooling operation.

When the equipment controller 50 terminates execution of the pressure difference control in step S130, the equipment controller 50 proceeds to step S140 so that the controller 30 of the outdoor unit 10 executes cooling operation control. This starts a cooling operation.

A method for setting the lower limit value TW of the inflow water temperature will now be described with reference to FIG. 3.

Figure 3:
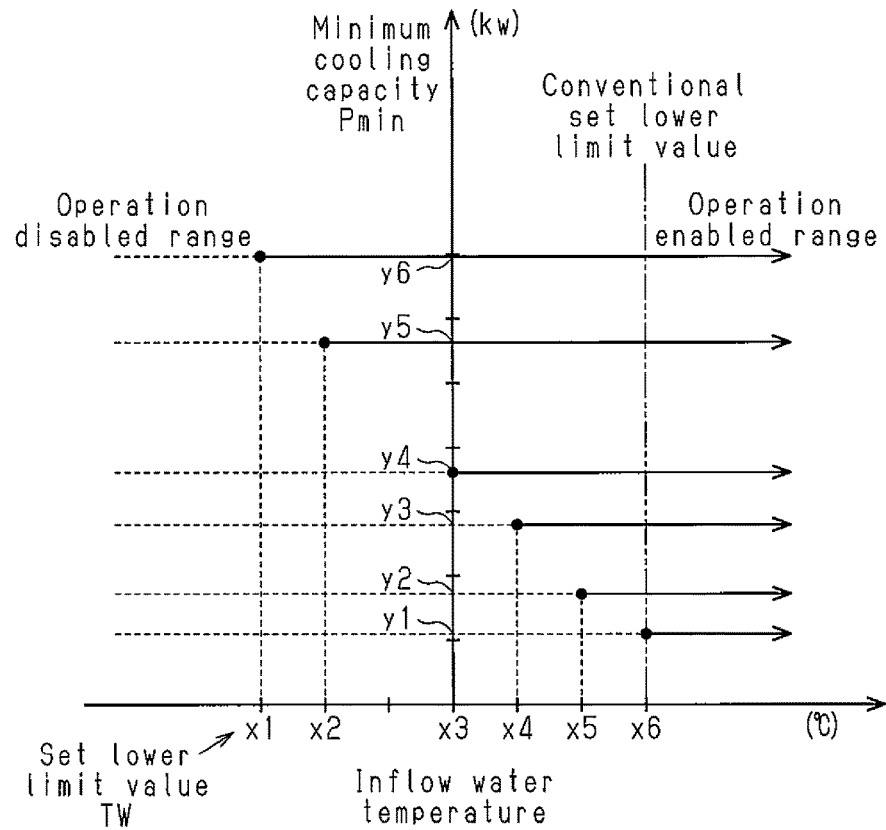
FIG. 3 is a diagram showing the relationship between the minimum cooling capacity and a set lower limit value of an inflow water temperature in the air conditioning system.

FIG. 3 shows the relationship of the minimum cooling capacity Pmin of the indoor unit arrangement of the air conditioning system 1 and the set lower limit value TW of the inflow water temperature. The minimum cooling capacity Pmin is the minimum value of the cooling capacity of the indoor unit arrangement when the air conditioning system 1 performs a cooling operation.

For example, in a first configuration in which the indoor unit arrangement includes indoor units 20 that have equal cooling capacities and are operable independently from one another, the minimum cooling capacity Pmin of the indoor unit arrangement is equal to the cooling capacity of a single indoor unit 20.

In a second configuration in which the indoor unit arrangement includes indoor units 20 that have different cooling capacities and are operable independently from one another, the minimum cooling capacity Pmin of the indoor unit arrangement is equal to the cooling capacity of the indoor unit 20 having the smallest cooling capacity.

The indoor units 20 may be operated together. More specifically, several indoor units 20 may simultaneously start or stop operating. When the indoor unit arrangement includes indoor units 20 that are operated together, the indoor units 20 that are operated together are recognized as a single indoor unit 20 to determine whether the indoor unit arrangement corresponds to the first or second configuration and to set the minimum cooling capacity Pmin of the indoor unit arrangement.

A method for setting the lower limit value TW in the air conditioning system 1 will now be described with reference to FIG. 3. FIG. 3 is referred to when setting the lower limit value TW and applied to an air conditioning system 1 in which the indoor units 20 are all located at an elevation that is lower than or the same as the outdoor unit 10.

As shown in FIG. 3, the lower limit value TW is determined based on the configuration of the indoor unit arrangement of the air conditioning system 1. More specifically, the lower limit value TW is determined in accordance with the minimum cooling capacity Pmin of the indoor unit arrangement of the air conditioning system 1. As the minimum cooling capacity Pmin increases, the lower limit value TW is set to be smaller.

For example, as shown in FIG. 3, when the minimum cooling capacity Pmin of the indoor unit arrangement of the air conditioning system 1 is y1 (kW), the lower limit value is set to x6 (° C.). When the minimum cooling capacity Pmin of the indoor unit arrangement of the air conditioning system 1 is y2 (kW), which is larger than y1 (kW), the lower limit value is set to x5 (° C.), which is smaller than x6 (° C.). In the same manner, when the minimum cooling capacity Pmin of the indoor unit arrangement of the air conditioning system 1 is y3 (kW), y4 (kW), y5 (kW), and y6 (kW), the lower limit value is set to x4 (° C.), x3 (° C.), x2 (° C.), and x1 (° C.), respectively.

The operation enabled range of the air conditioning system 1 is applicable when the inflow water temperature is equal to or greater than the set lower limit value TW. As shown in FIG. 3, the operation enabled range of the air conditioning system 1 expands as the minimum cooling capacity Pmin increases.

The lower limit value TW is set in such a manner for the reasons described below.

The cooling capacity of the indoor unit arrangement of the air conditioning system 1 is in accordance with the amount of heat dissipated from the outdoor unit 10. More specifically, as the cooling capacity of the indoor unit arrangement increases, the amount of heat dissipated from the outdoor unit 10 increases. As the amount of heat dissipation increases, the high pressure in the outdoor unit 10 decreases less easily. As the amount of heat dissipation decreases, the high pressure in the outdoor unit 10 decreases more easily. Thus, a first setting condition is in that the set lower limit value decreases as the cooling capacity increases.

When starting a cooling operation in the air conditioning system 1, it is preferred that the pressure difference in the outdoor unit 10 be maintained to be greater than or equal to the predetermined value that enables a cooling operation to be performed regardless of the number of the indoor units 20 that start operating simultaneously. A second setting condition is in that the pressure difference in the outdoor unit 10 is maintained to be greater than or equal to the predetermined value that enables a cooling operation to be performed at the minimum cooling capacity Pmin of the indoor unit arrangement when starting a cooling operation. In view of the first and second setting conditions, the air conditioning system 1 sets the lower limit value TW of the inflow water temperature to be smaller as the minimum cooling capacity Pmin increases.

Figure 4:
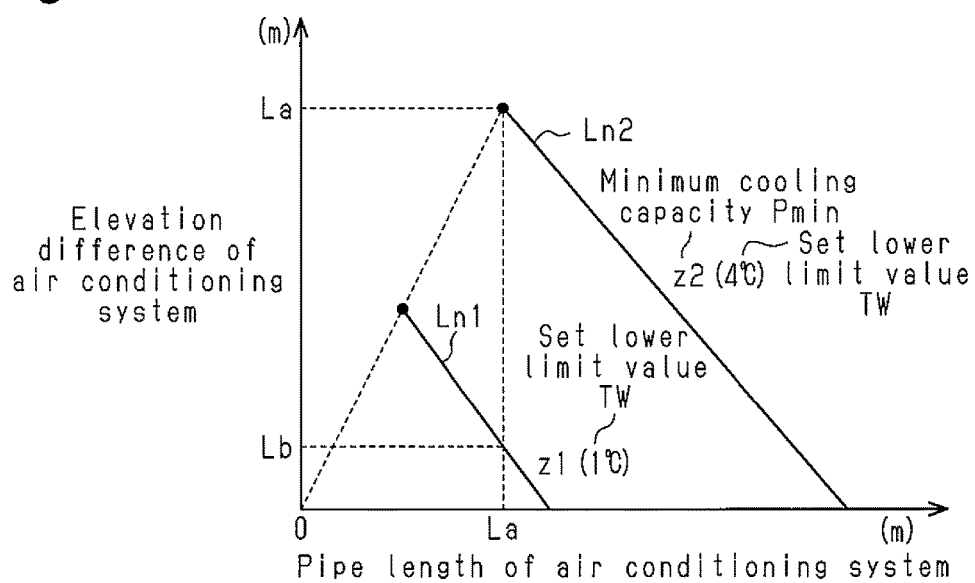
FIG. 4 is a diagram showing the relationship of the elevation difference, the pipe length, and the set lower limit value of the inflow water temperature in the air conditioning system.

Another example of a method for setting the lower limit value TW in the air conditioning system 1 will now be described with reference to FIG. 4. FIG. 4 is referred to when setting the lower limit value TW and applied to an air conditioning system 1 in which the indoor units 20 are all located at an elevation that is higher than the outdoor unit 10.

When the indoor unit 20 is arranged at a higher elevation than the outdoor unit 10, a pressure loss occurs in the liquid connection pipe 23. The pressure loss is in accordance with the pipe length and the elevation difference in the air conditioning system 1. More specifically, the pressure loss increases as the pipe length increases and as the elevation difference increases. Such a pressure loss decreases the pressure difference of the outdoor unit 10. Thus, the pressure loss needs to be taken into account when setting the lower limit value TW of the inflow water temperature.

When the indoor unit 20 is arranged at a higher elevation than the outdoor unit 10, the lower limit value TW is set taking into consideration the pipe length and the elevation difference of the air conditioning system 1 in addition to the minimum cooling capacity Pmin of the air conditioning system 1.

The pipe length and the elevation difference of the air conditioning system 1 are obtained in the following manner. The pipe length of the air conditioning system 1 is obtained from the longest one of the liquid connection pipes 23 of each indoor unit 20. The elevation difference of the air conditioning system 1 is obtained from the difference between the elevation of the highest one of the indoor units 20 and the elevation of the outdoor unit 10.

FIG. 4 is a map used to obtain the set lower limit value TW of the inflow water temperature based on the pipe length and the elevation difference in the air conditioning system 1 having the predetermined minimum cooling capacity Pmin (z1). In FIG. 4, La in the vertical axis and La in the horizontal axis represent the same value.

In FIG. 4, the vertical axis represents the elevation difference of the air conditioning system 1 and the horizontal axis represents the pipe length of the air conditioning system 1. More specifically, the coordinates (pipe length and elevation difference) in the map of FIG. 4 show the installed state of the air conditioning system 1 represented by the elevation difference and the pipe length.

The solid lines in the graph of FIG. 4 are isotherm lines each of which indicates the installed states of the air conditioning system 1 having the same set lower limit value TW of the inflow water temperature. That is, when the installed states of the air conditioning system 1 are on the same isotherm line, their set lower limit values TW have the same value. For example, the lower limit value TW is set to 1° C. in the installed states indicated by isotherm line Ln1. The lower limit value TW is set to 4° C. in the installed states indicated by isotherm line Ln2. That is, the lower limit value TW is set to increase as the pipe length and the elevation difference increase. This is because the pressure loss increases as the pipe length and the elevation difference increase.

Many lines having substantially the same gradient as the isotherm line Ln1 or Ln2 within a predetermined temperature range are actually included between the isotherm lines Ln1 and Ln2, in the lower left side of the isotherm line Ln1, and in the upper right side of the isotherm line Ln2. However, these lines are omitted from FIG. 4.

The isotherm lines Ln1 and Ln2 do not extend in the upper left direction beyond the broken line in FIG. 4 that connects the origin with the coordinates (La, La). This is because the pipe length of the air conditioning system 1 is greater than or equal to the elevation difference.

The lower limit value TW of the inflow water temperature is set as described below.

When the pipe length of the air conditioning system 1 is La and the elevation difference of the air conditioning system 1 is Lb, an isotherm line that extends through the coordinates (La, Lb) is selected from the isotherm lines shown in the graph of FIG. 4. The temperature shown by the selected isotherm line is set as the set lower limit value TW of the inflow water temperature of the air conditioning system 1.

Figure 5:
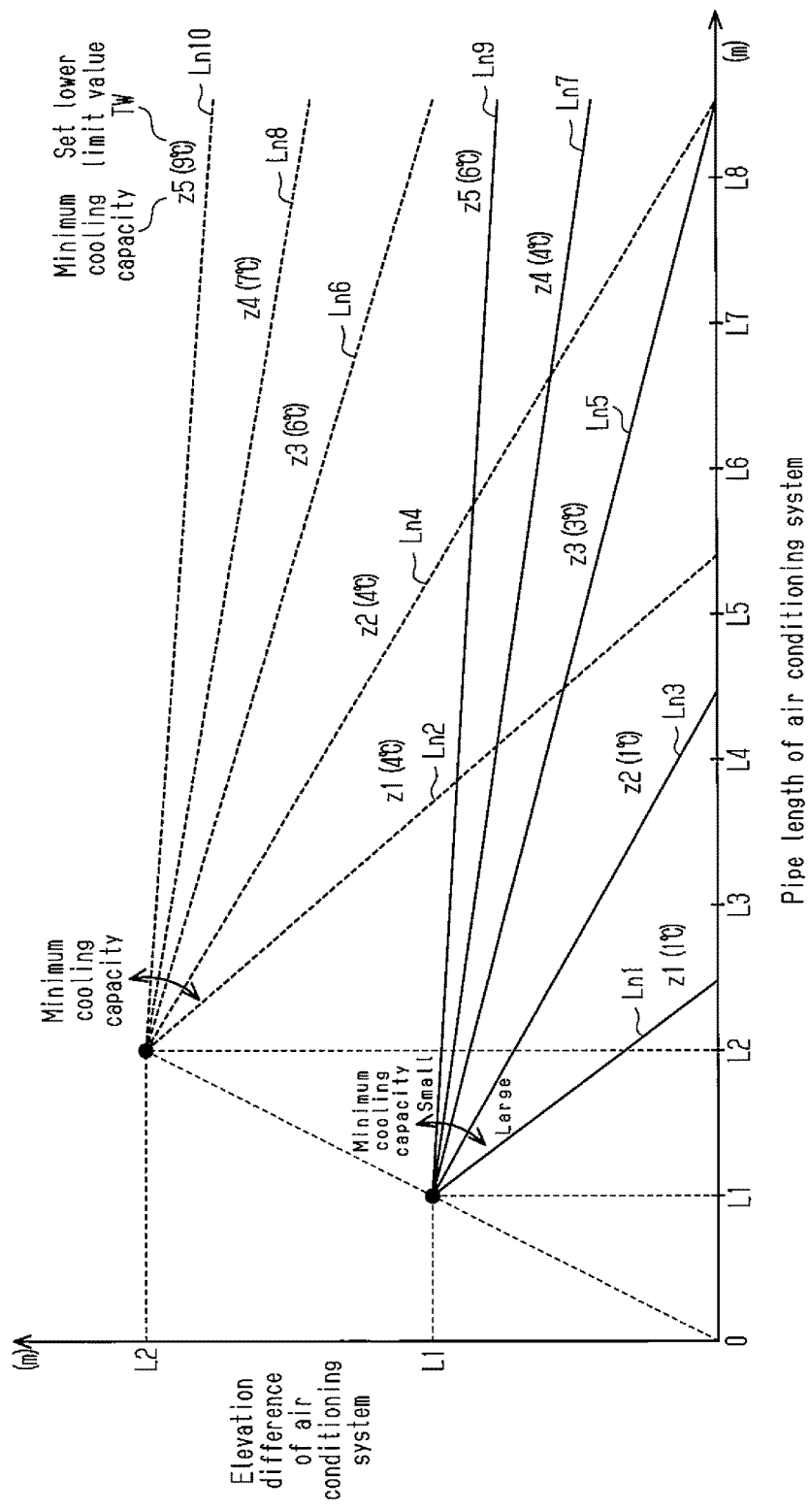
FIG. 5 is a diagram showing the relationship of the elevation difference, the pipe length, and the set lower limit value of the inflow water temperature in different air conditioning systems.

FIG. 5 shows the isotherm lines for calculating the set lower limit value TW of the inflow water temperature for air conditioning systems 1 in which the minimum cooling capacity Pmin is z1, z2, z3, z4, and z5, respectively. The values of z1, z2, z3, z4, and z5 decrease in this order (from left to right). For example, z1 represents 14.0 kw, z2 represents 11.2 kw, z3 represents 8.0 kw, z4 represents 5.6 kw, and z5 represents 3.6 kw.

In FIG. 5, L1 in the vertical axis and L1 in the horizontal axis represent the same value, and L2 in the vertical axis and L2 in the horizontal axis represent the same value.

The isotherm lines Ln1 and Ln2 are used for the air conditioning system 1 in which the minimum cooling capacity Pmin is z1. The isotherm lines Ln1 and Ln2 shown in FIG. 5 are the same as the isotherm lines Ln1 and Ln2 shown in FIG. 4.

Isotherm lines Ln3 and Ln4 are used for the air conditioning system 1 in which the minimum cooling capacity Pmin is z2. In the installed state on the isotherm line Ln3, the lower limit value TW of the inflow water temperature is set to 1° C. In the installed state on the isotherm line Ln4, the lower limit value TW of the inflow water temperature is set to 4° C.

Isotherm lines Ln5 and Ln6 are used for the air conditioning system 1 in which the minimum cooling capacity Pmin is z3. In the installed state on the isotherm line Ln5, the lower limit value TW of the inflow water temperature is set to 3° C. In the installed state on the isotherm line Ln6, the lower limit value TW of the inflow water temperature is set to 6° C.

Isotherm lines Ln7 and Ln8 are used for the air conditioning system 1 in which the minimum cooling capacity Pmin is z4. In the installed state on the isotherm line Ln7, the lower limit value TW of the inflow water temperature is set to 4° C. In the installed state on the isotherm line Ln8, the lower limit value TW of the inflow water temperature is set to 7° C.

Isotherm lines Ln9 and Ln10 are used for the air conditioning system 1 in which the minimum cooling capacity Pmin is z5. In the installed state on the isotherm line Ln9, the lower limit value TW of the inflow water temperature is set to 6° C. In the installed state on the isotherm line Ln10, the lower limit value TW of the inflow water temperature is set to 9° C.

As shown in FIG. 5, even when the air conditioning system 1 is in the same installed state, the set lower limit value TW of an inflow water temperature differs in accordance with the minimum cooling capacity Pmin. More specifically, as the minimum cooling capacity Pmin increases, the lower limit value TW of the inflow water temperature is set to be lower. This is because as the minimum cooling capacity Pmin increases, the pressure difference of the outdoor unit 10 does not easily become small.

The air conditioning system 1 is set so that the gradient of the isotherm line differs in accordance with the minimum cooling capacity Pmin of the air conditioning system 1. The gradient becomes greater as the minimum cooling capacity Pmin increases. This indicates that the pipe length less affects the set lower limit value TW of the inflow water temperature than the elevation difference as the minimum cooling capacity Pmin decreases. For example, in the air conditioning system 1 in which the minimum cooling capacity Pmin is small, the elevation difference decreases slightly even when the pipe length is increased as shown in the isotherm line Ln9.

The operation of the air conditioning system 1 will now be described in comparison with a conventional air conditioning system.

In the prior art, a predetermined lower limit value TW is set for the air conditioning system regardless of the minimum cooling capacity Pmin of the air conditioning system. However, a variety of indoor unit arrangements may be configured for the air conditioning system. Thus, the set lower limit value TW is set as follows so that a cooling operation can be stably started in any configuration. Among all of the indoor unit arrangements applicable to the air conditioning system, the one having the smallest cooling capacity is used to obtain the set lower limit value TW so that the pressure difference of the outdoor unit 10 is greater than or equal to a predetermined value that enables a cooling operation to be performed. The set lower limit value TW obtained in this manner is applied to each air conditioning system 1.

For example, in a conventional air conditioning system similar to the air conditioning system 1 shown in FIG. 3, the minimum cooling capacity Pmin may be set to y1 to y6 in accordance with the configuration of the indoor unit arrangement. The minimum value of the minimum cooling capacity Pmin is y1 in the air conditioning system 1. In the conventional air conditioning system, x6 corresponding to the minimum cooling capacity Pmin y1 is set as the set lower limit value TW regardless of the configuration of the indoor unit arrangement.

However, such setting of the minimum cooling capacity Pmin has the following problem.

In an air conditioning system having a small minimum cooling capacity Pmin (for example, the air conditioning system 1 in which the minimum cooling capacity Pmin is y1), the lower limit of the inflow water temperature in the range in which the cooling operation is enabled conforms to the set lower limit value TW. Thus, the set lower limit value TW separates the operation enabled range and the operation disabled range in a desirable manner.

In an air conditioning system having a large minimum cooling capacity Pmin (for example, the air conditioning system 1 in which the minimum cooling capacity Pmin is y6), the set lower limit value TW does not separate the operation enabled range and the operation disabled range in a desirable manner.

More specifically, in the air conditioning system in which the minimum cooling capacity Pmin is y6, the lower limit temperature of the operation enabled range (x1) is lower than the set lower limit value TW (x6). Thus, a cooling operation may be performed even when the inflow water temperature is lower than the set lower limit value TW (x6). However, in the conventional air conditioning system, the lower limit value TW is set to a high value. Thus, when the inflow water temperature is included in the range of x1 to x6, water is heated to increase the inflow water temperature. That is, in the prior art, water may be heated when unnecessary.

In the air conditioning system 1 of the present embodiment, the set lower limit value TW of the inflow water temperature is variable. The lower limit value TW of the inflow water temperature is set in accordance with the minimum cooling capacity Pmin of the indoor unit arrangement. That is, the lower limit value TW is set to a smaller value as the minimum cooling capacity Pmin increases, and the lower limit value TW is set to a larger value as the minimum cooling capacity Pmin decreases. The lower limit value TW is set when installing the air conditioning system 1. The set lower limit value TW is varied when adding, replacing, or removing an indoor unit 20.

The setting of the lower limit value TW in this manner limits the heating of water when the inflow water temperature is included in the operation enabled range of the air conditioning system 1. When the indoor unit arrangement of the air conditioning system 1 has a large minimum cooling capacity Pmin, the operation enabled range in which a cooling operation can be performed without heating water is enlarged as compared with the conventional air conditioning system.

The air conditioning system 1 of the present embodiment is configured to vary the set lower limit value TW of the inflow water temperature. Thus, the lower limit value TW can be set when or after the air conditioning system 1 is installed. When the structure of the indoor unit arrangement is changed, the set lower limit value TW can be varied in accordance with the change.

The present embodiment has the advantages described below.

(1) The equipment controller 50 stores the set lower limit value TW that specifies the lower limit of the inflow water temperature so that the pressure difference between the high pressure and the low pressure in the outdoor unit 10 is maintained to be greater than or equal to a predetermined value that enables a cooling operation to be performed. The lower limit value is set to be smaller as the minimum cooling capacity Pmin increases. The minimum cooling capacity Pmin is the smallest value of the cooling capacity of the indoor unit arrangement.

When starting a cooling operation, the equipment controller 50 determines whether the inflow water temperature is greater than or equal to the set lower limit value TW. When the inflow water temperature is greater than or equal to the set lower limit value TW, the pressure difference control that limits decreases in the pressure difference is not performed and cooling operation control is executed. When the inflow water temperature is lower than the set lower limit value TW, the pressure difference control is performed.

More specifically, the lower limit value TW is set for each air conditioning system 1 in accordance with the minimum cooling capacity Pmin of the indoor unit arrangement of the air conditioning system 1. This limits unnecessary water heating, which may occur depending on the configuration of the air conditioning system 1.

(2) The equipment controller 50 reduces the amount of water flowing into the outdoor unit 10 through performing the pressure difference control. In this configuration, the amount of water flowing into the outdoor unit 10 decreases. This increases the water temperature rising rate and limits decreases in the pressure difference of the outdoor unit 10.

(3) When the indoor unit 20 is arranged at a higher elevation than the outdoor unit 10, the lower limit value TW is set based on the minimum cooling capacity Pmin, the lengths of the connection pipes 23 and 24 that connect the indoor unit 20 and the outdoor unit 10, and the elevation difference between the indoor unit 20 and the outdoor unit 10.

When a plurality of indoor units 20 are arranged at a higher elevation than the outdoor unit 10, the pressure loss caused by the pipe length and the elevation difference affects the pressure difference of the outdoor unit 10. Thus, it is preferred that the pressure loss caused by the pipe length and the elevation difference be taken into account when estimating the set lower limit value TW. In the present embodiment, the pipe length and the elevation difference are taken into account when setting the lower limit value TW. Thus, the lower limit value TW of the air conditioning system 1 is set more optimally in accordance with the air conditioning system 1 than when the lower limit value TW is set without taking the pipe length or the elevation difference into account.

It should be apparent to those skilled in the art that the present invention may be embodied in many other specific forms without departing from the spirit or scope of the invention. Particularly, it should be understood that the present invention may be embodied in the following forms.

An air conditioning system of a modified example will now be described. The air conditioning system of the modified example differs from the air conditioning system 1 of the above embodiment in that the air conditioning system of the modified example performs the following process during a cooling operation. This process is not performed in the above embodiment.

In the air conditioning system of the modified example, the equipment controller 50 obtains the inflow water temperature during a cooling operation and derives a lower limit cooling capacity from the obtained inflow water temperature. The equipment controller 50 also derives a total cooling capacity from indoor unit information output from the outdoor unit 10. The total cooling capacity is the total of the cooling capacities of the operating indoor units 20. When the total cooling capacity is smaller than the lower limit cooling capacity, the pressure difference control is performed. The lower limit cooling capacity is the lower limit value of the cooling capacity that allows the pressure difference of the outdoor unit 10 to be greater than or equal to a predetermined value, which enables a cooling operation to be performed, at a predetermined inflow water temperature. The lower limit cooling capacity is set to be higher as the inflow water temperature decreases.

A comparative configuration will now be described before describing the operation of the air conditioning system of the modified example. A predetermined lower limit value is set for the inflow water temperature. In this case, the pressure difference control is performed when the inflow water temperature becomes lower than the set lower limit value TW. However, the pressure difference control is performed even when the indoor unit arrangement has a large cooling capacity and is able to perform a cooling operation. In such a case, the cooling efficiency may be reduced.

In the modified example, the lower limit value of the cooling capacity (i.e., lower limit cooling capacity), which can be set to a predetermined value that enables a cooling operation to be performed, is set in accordance with the inflow water temperature during a cooling operation. The lower limit cooling capacity and the total cooling capacity are compared to determine whether or not the total cooling capacity is less than the lower limit cooling capacity. When the total cooling capacity is less than the lower limit cooling capacity, that is, when the total cooling capacity is decreased such that the pressure difference of the outdoor unit 10 cannot be set to the predetermined value that enables the air conditioning system 1 to perform a cooling operation, the pressure difference control is performed. As a result, the cooling operation can be stably continued even when the inflow water temperature is low and the total cooling capacity is insufficient during a cooling operation. When the indoor unit arrangement has a large cooling capacity and is able to perform the cooling operation, the execution of the pressure difference control can be skipped.

Figure 6:
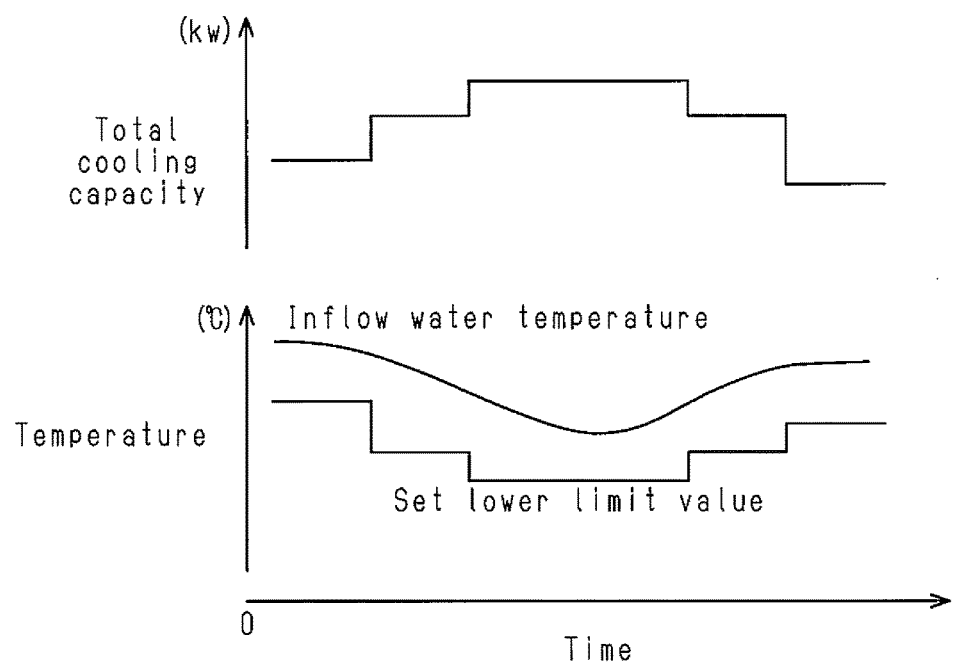
FIG. 6 is a graph showing the total cooling capacity, the set lower limit value, and the inflow water temperature with respect to time in an air conditioning system of a modified example.

An air conditioning system of another modified example will be described with reference to FIG. 6. The air conditioning system of the modified example differs from the air conditioning system 1 of the above embodiment in that the air conditioning system 1 of the modified example varies the set lower limit value TW during a cooling operation.

An abrupt change in the weather may decrease the inflow water temperature during a cooling operation from the inflow water temperature when the cooling operation was started. In such a case, the cooling operation may be stopped and switched to a blowing operation. However, there may be cases in which the cooling operation can be continued when a plurality of indoor units 20 of the indoor unit arrangement are operated during the cooling operation.

Thus, the total cooling capacity of the entire indoor unit arrangement is taken into account when varying the set lower limit value TW for the inflow water temperature. For example, as the total cooling capacity increases, the set lower limit value TW is varied to a lower value. This reduces stopping of the cooling operation as compared to when the set lower limit value TW is not changed in such a manner.

In the above embodiment, the bypass valve 19 opens to control the pressure difference and limit decreases in the pressure difference between the high pressure and the low pressure in the outdoor unit 10. However, the pressure difference does not have to be controlled in such a manner.

For example, the pressure difference control may heat water with a boiler or reduce the rotation speed of a fan in a cooling tower.

Alternatively, the refrigerant circuit 2 may include a bypass pipe connected in parallel to the outdoor unit 10 to control the flow rate of the refrigerant flowing through the bypass pipe. For example, when the inflow water temperature is lower than the set lower limit value TW, the flow rate of the refrigerant in the bypass pipe may be increased. This limits decreases in the refrigerant temperature and limits decreases in the pressure difference of the outdoor unit 10.

The control described below may be performed as another example of the pressure difference control. The cooling capacity of the indoor unit arrangement of the air conditioning system 1 may be increased. For example, indoor units 20 used to cool facilities such as a computer room automatically start operation. This increases the amount of heat dissipation from the refrigerant in the outdoor heat exchanger 12 and limits decreases in the pressure difference of the outdoor unit 10.

When starting a cooling operation, the cooling operation may be stopped without performing the pressure difference control. More specifically, when the equipment controller 50 determines in the starting process of step S120 that the inflow water temperature is lower than the set lower limit value TW, the equipment controller 50 transmits an instruction signal to the outdoor unit 10 and causes the controller 30 to stop the cooling operation to terminate the starting process. In such a case, advantage (1) of the above embodiment is obtained. That is, unnecessary water heating, which may occur depending on the configuration of the air conditioning system 1, does not occur.

The present examples and embodiments are to be considered as illustrative and not restrictive, and the invention is not to be limited to the details given herein, but may be modified within the scope and equivalence of the appended claims.

The invention claimed is:

1. An air conditioning system comprising:
   an outdoor unit that exchanges heat between water and refrigerant and in which low pressure and high pressure are generated;
   a plurality of indoor units that is connected to the outdoor unit;
   a water temperature detector that detects an inflow water temperature, which is a temperature of water flowing into the outdoor unit;
   a controller that controls the low pressure in the outdoor unit at a fixed pressure during a cooling operation; and
   an equipment controller that is arranged in water supplying equipment, wherein:
   the equipment controller stores a set lower limit value that specifies a lower limit of the inflow water temperature, the equipment controller is configured to set the lower limit value to maintain a pressure difference between the high pressure and the low pressure in the outdoor unit at a predetermined value or greater, wherein the predetermined value of the pressure difference enables a cooling operation to be performed, and the equipment controller is configured to set the lower limit value to be smaller as a minimum cooling capacity increases, wherein the minimum cooling capacity is the minimum value of a cooling capacity of an indoor unit arrangement formed by the indoor units; and
   the equipment controller determines whether or not the inflow water temperature is greater than or equal to the set lower limit value when starting a cooling operation, the equipment controller performs pressure difference control for limiting decreases in the pressure difference of the outdoor unit when the inflow water temperature is less than the set lower limit value, and the equipment controller does not perform the pressure difference control when the inflow water temperature is greater than or equal to the set lower limit value.

2. The air conditioning system according to claim 1, wherein:
   the equipment controller obtains the inflow water temperature during a cooling operation and derives a lower limit cooling capacity from the obtained inflow water temperature, wherein the lower limit cooling capacity is a lower limit value of the cooling capacity that allows the pressure difference of the outdoor unit to be greater than or equal to the predetermined value; and
   the equipment controller performs the pressure difference control when a total cooling capacity is less than the lower limit cooling capacity, wherein the total cooling capacity is the total of cooling capacities of the indoor units that are operated.

3. The air conditioning system according to claim 1, wherein the equipment controller decreases the amount of water flowing into the outdoor unit through performing the pressure difference control.

4. The air conditioning system according to claim 1, wherein when the indoor units are arranged at a higher elevation than the outdoor unit, the equipment controller is configured to set the lower limit value based on the minimum cooling capacity, lengths of connection pipes that connect the indoor units and the outdoor unit, and an elevation difference between the indoor units and the outdoor unit.

5. An air conditioning system comprising:
   an outdoor unit that exchanges heat between water and refrigerant and in which low pressure and high pressure are generated;
   a plurality of indoor units that is connected to the outdoor unit;
   a water temperature detector that detects an inflow water temperature, which is a temperature of water flowing into the outdoor unit;
   a controller that controls the low pressure in the outdoor unit at a fixed pressure during a cooling operation; and
   an equipment controller that is arranged in a water heat source device, wherein:
   the equipment controller stores a set lower limit value that specifies a lower limit of the inflow water temperature, the equipment controller is configured to set the lower limit value to maintain a pressure difference between the high pressure and the low pressure in the outdoor unit at a predetermined value or greater, and the predetermined value of the pressure difference enables a cooling operation to be performed;
   the equipment controller is configured to set the lower limit value during a cooling operation in accordance with a minimum cooling capacity, wherein the minimum cooling capacity is the minimum value of a cooling capacity of an indoor unit arrangement formed by the indoor units, the controller continues the cooling operation when the inflow water temperature is greater than or equal to the set lower limit value, and the controller stops the cooling operation when the inflow water temperature is less than the set lower limit value.

6. An air conditioning system comprising:
an outdoor unit that exchanges heat between water and refrigerant and in which low pressure and high pressure are generated;
a plurality of indoor units that is connected to the outdoor unit;
a water temperature detector that detects an inflow water temperature, which is a temperature of water flowing into the outdoor unit;
a controller that controls the low pressure in the outdoor unit at a fixed pressure during a cooling operation; and
an equipment controller that is arranged in a water heat source device,
wherein the equipment controller stores a set lower limit value that specifies a lower limit of the inflow water temperature, the equipment controller is configured to set the lower limit value to maintain a pressure difference between the high pressure and the low pressure in the outdoor unit at a predetermined value or greater, wherein the predetermined value of the pressure difference enables a cooling operation to be performed, and the equipment controller is configured to set the lower limit value to be smaller as a minimum cooling capacity increases, wherein the minimum cooling capacity is the minimum value of a cooling capacity of an indoor unit arrangement formed by the indoor units.

* * * * *